US011035936B2

(12) United States Patent
Matsumoto et al.

(10) Patent No.: US 11,035,936 B2
(45) Date of Patent: Jun. 15, 2021

(54) DEFLECTING DEVICE AND SURVEYING INSTRUMENT

(71) Applicant: TOPCON CORPORATION, Tokyo (JP)

(72) Inventors: Hideyuki Matsumoto, Tokyo (JP); Fumio Ohtomo, Asaka (JP)

(73) Assignee: TOPCON CORPORATION, Tokyo (JP)

( * ) Notice: Subject to any disclaimer, the term of this patent is extended or adjusted under 35 U.S.C. 154(b) by 224 days.

(21) Appl. No.: 16/019,794

(22) Filed: Jun. 27, 2018

(65) Prior Publication Data
US 2019/0004154 A1 Jan. 3, 2019

(30) Foreign Application Priority Data
Jun. 28, 2017 (JP) .............................. JP2017-126109

(51) Int. Cl.
*G01S 7/481* (2006.01)
*G01S 7/48* (2006.01)
(Continued)

(52) U.S. Cl.
CPC .............. *G01S 7/4817* (2013.01); *G01C 3/08* (2013.01); *G01C 15/008* (2013.01);
(Continued)

(58) Field of Classification Search
CPC ...... G01S 7/4817; G01S 7/4808; G01S 17/42; G01S 17/08; G01C 3/08; G01C 15/008
(Continued)

(56) References Cited

U.S. PATENT DOCUMENTS 6,462,810 B1   10/2002   Muraoka et al.
8,218,131 B2   7/2012    Otani et al.
(Continued)

FOREIGN PATENT DOCUMENTS

JP    2000-346645 A    12/2000
JP    2008-076303 A    4/2008
(Continued)

OTHER PUBLICATIONS

Final Office Action dated Feb. 4, 2021, in connection with U.S. Appl. No. 151975,049, filed May 9, 2018, 8 pgs.
(Continued)

*Primary Examiner* — Daniel L Murphy
(74) *Attorney, Agent, or Firm* — Chiesa Shahinian & Giantomasi PC

(57) ABSTRACT

A deflecting device and a surveying instrument for deflecting an optical axis two-dimensionally comprising a ring-shaped holding member; ring gears disposed on both sides of the holding member with the holding member interposed between the ring gears and concentric with the holding member; rotary bearings disposed between the holding member and the ring gears on both sides of the holding member and concentric with the holding member; optical deflecting members disposed at central portions of the ring gears and integrated with the ring gears; deflection motors corresponding to the respective ring gears; a drive transmitting member configured to transmit rotary force of the deflection motors to the ring gears; and urging members configured to urge the ring gears in a direction parallel with rotation axes of the ring gears.

15 Claims, 13 Drawing Sheets

(51) Int. Cl.
    *G01S 17/08* (2006.01)
    *G01S 17/42* (2006.01)
    *G01C 15/00* (2006.01)
    *G01C 3/08* (2006.01)

(52) U.S. Cl.
    CPC ............ *G01S 7/4808* (2013.01); *G01S 17/08* (2013.01); *G01S 17/42* (2013.01)

(58) Field of Classification Search
    USPC ........................................................ 356/4.01
    See application file for complete search history.

(56) References Cited

U.S. PATENT DOCUMENTS

| | | |
|---|---|---|
| 10,823,823 B2 | 11/2020 | Ohtomo et al. |
| 2016/0238385 A1 | 8/2016 | Ohtomo et al. |
| 2016/0238708 A1 | 8/2016 | Ohtomo et al. |
| 2017/0168142 A1 | 6/2017 | Kumagai et al. |
| 2018/0106615 A1 | 4/2018 | Ohtomo et al. |
| 2018/0328728 A1* | 11/2018 | Matsumoto ........... G01S 7/4817 |

FOREIGN PATENT DOCUMENTS

| | | |
|---|---|---|
| JP | 2016-151422 A | 8/2016 |
| JP | 2016-151423 A | 8/2016 |
| WO | 2004099849 A1 | 11/2004 |

OTHER PUBLICATIONS

Notice of Allowance (PTOL-85) dated Apr. 14, 2021, in connection with U.S. Appl. No. 15/975,049, filed May 9, 2018, 11 pgs.

\* cited by examiner

DEFLECTING DEVICE AND SURVEYING INSTRUMENT

CROSS-REFERENCE TO RELATED APPLICATION

This application is based upon and claims benefit of priority from Japanese Patent Application No. 2017-126109, filed Jun. 28, 2017, the entire contents of which are incorporated herein by reference.

TECHNICAL FIELD

The present disclosure relates to a deflecting device and a surveying instrument that are capable of deflecting an optical axis two-dimensionally.

BACKGROUND

In the related art, a surveying instrument, for example, a total station, includes a mount section capable of rotating in a horizontal direction and a telescope section disposed on the mount section and capable of rotating in a vertical direction. A distance meter and a collimator are embedded in the telescope section. Distance measuring light illuminates a measurement target object concentrically with the collimator.

In the total station, horizontal rotation of the mount section and vertical rotation of the telescope section cooperate to deflect the distance measuring optical axis in two directions, horizontally and vertically.

The mount section and the telescope section have a great mass and are difficult to rotate fast and stop promptly. However, significantly high deflection angle accuracy is required. Thus, high machining accuracy and assembling accuracy are required for the mechanism, resulting in high manufacturing cost.

SUMMARY OF THE EMBODIMENTS

An object of the disclosure is to provide an inexpensive deflecting device and surveying instrument that are capable of deflecting a distance measuring optical axis at high speed in two directions, horizontally and vertically.

The disclosure provides a deflecting device including: a holding member having a ring shape; ring gears disposed on both sides of the holding member with the holding member interposed between the ring gears, the ring gears being concentric with the holding member; rotary bearings disposed between the holding member and the ring gears on both sides of the holding member, the rotary bearings being concentric with the holding member; optical deflecting members disposed at central portions of the ring gears and integrated with the ring gears; deflection motors corresponding to the respective ring gears; a drive transmitting member configured to transmit rotary force of the deflection motors to the ring gears; and urging members configured to urge the ring gears in a direction parallel with rotation axes of the ring gears. Each of the rotary bearings includes an outer ring fitted into and fixed to an outer ring fitting section on either one of the holding member and the corresponding ring gear. Each of the rotary bearings includes an inner ring fitted into and fixed to an inner ring fitting section on the other of the holding member and the corresponding ring gear. The ring gears on both sides of the holding member are supported by the holding member, the ring gears being configured to rotate independently of each other. The deflection motors are configured to independently rotate the respective optical deflecting members together with the ring gears with the urging members urging the ring gears.

The disclosure also provides a deflecting device further including a supporting plate fixed to an outer peripheral surface of the holding member. The supporting plate includes extending portions each extending parallel with a side surface of the corresponding ring gear. Each of the urging members includes a magnetic member having a ring shape and fixed to the side surface of each of the ring gears and a magnet disposed in a portion, facing the magnetic member, of the corresponding extending portion.

The disclosure also provides a deflecting device further including a plurality of supporting plates fixed to an outer peripheral surface of the holding member at regular angular intervals. Each of the plurality of supporting plates includes extending portions each extending parallel with a side surface of the corresponding ring gear. Each of the urging members includes a magnetic member having a ring shape, disposed on the corresponding extending portion, and concentric with the holding member, and a magnet disposed in a portion, facing the magnetic member, of the side surface of each of the ring gears.

The disclosure also provides a deflecting device in which each of the urging members includes a magnetic member having a ring shape and disposed on a peripheral surface of the corresponding ring gear while protruding toward an outer periphery, and a magnet disposed on an outer peripheral surface of the holding member while facing the magnetic member.

The disclosure also provides a deflecting device further including: a protractor disposed on a surface of each of the ring gears, the protractor being concentric with each of the ring gears; and an angle measuring sensor disposed in a portion, facing the protractor, of one of the extending portions.

The disclosure also provides a deflecting device further including a supporting plate fixed to an outer peripheral surface of the holding member. The supporting plate includes extending portions each extending parallel with a side surface of the corresponding ring gear. The deflecting device further includes: a protractor disposed on the side surface of each of the ring gears, the protractor being concentric with each of the ring gears; and an angle measuring sensor disposed in a portion, facing the protractor, of each of the extending portions.

Furthermore, the disclosure provides a surveying instrument including: a distance meter including a light emitting element configured to send out distance measuring light, a distance measuring light emitter configured to emit the distance measuring light, a receiver configured to receive reflected distance measuring light, and a light receiving element configured to receive the reflected distance measuring light and to generate a light reception signal, the distance meter being configured to measure a distance to a measurement target object on a basis of the light reception signal from the light receiving element; an optical axis deflector disposed on a distance measuring optical axis and configured to deflect the distance measuring optical axis; an emission direction detector configured to detect a deflection angle of the distance measuring optical axis; and a computation controller configured to control deflection action of the optical axis deflector and distance measuring action of the distance meter. The optical axis deflector is any one of the above-described deflecting devices. The computation controller is configured to measure a horizontal angle and a vertical angle of the measurement target object on a basis of the deflection angle detected by the emission direction detector and acquires three-dimensional coordinates of the measurement target object on a basis of a distance value from the distance meter and the horizontal angle and vertical angle.

According to an aspect of the disclosure, the deflecting device includes: a holding member having a ring shape; ring gears disposed on both sides of the holding member with the holding member interposed between the ring gears, the ring gears being concentric with the holding member; rotary bearings disposed between the holding member and the ring gears on both sides of the holding member, the rotary bearings being concentric with the holding member; optical deflecting members disposed at central portions of the ring gears and integrated with the ring gears; deflection motors corresponding to the respective ring gears; a drive transmitting member configured to transmit rotary force of the deflection motors to the ring gears; and urging members configured to urge the ring gears in a direction parallel with rotation axes of the ring gears. Each of the rotary bearings includes an outer ring fitted into and fixed to an outer ring fitting section on either one of the holding member and the corresponding ring gear. Each of the rotary bearings includes an inner ring fitted into and fixed to an inner ring fitting section on the other of the holding member and the corresponding ring gear. The ring gears on both sides of the holding member are supported by the holding member, the ring gears being configured to rotate independently of each other. The deflection motors independently rotate the respective optical deflecting members together with the ring gears with the urging members urging the ring gears. This configuration enables deflection in two axial directions with a simple configuration, inexpensive manufacture, prevention of rattling during rotation, and highly accurate rotation.

According to an aspect of the disclosure, the surveying instrument includes: a distance meter including a light emitting element configured to send out distance measuring light, a distance measuring light emitter configured to emit the distance measuring light, a receiver configured to receive reflected distance measuring light, and a light receiving element configured to receive the reflected distance measuring light and to generate a light reception signal, the distance meter being configured to measure a distance to a measurement target object on a basis of the light reception signal from the light receiving element; an optical axis deflector disposed on a distance measuring optical axis and configured to deflect the distance measuring optical axis; an emission direction detector configured to detect a deflection angle of the distance measuring optical axis; and a computation controller configured to control deflection action of the optical axis deflector and distance measuring action of the distance meter. The optical axis deflector is any one of the above-described deflecting devices. The computation controller is configured to measure a horizontal angle and a vertical angle of the measurement target object on a basis of the deflection angle detected by the emission direction detector and acquires three-dimensional coordinates of the measurement target object on a basis of a distance value from the distance meter and the horizontal angle and vertical angle. This configuration exhibits excellent effect of enabling readily and prompt collimation and measurement as a total station or a laser scanner.

DESCRIPTION OF EMBODIMENTS

Embodiments of the disclosure will be described next with reference to the drawings.

Figure 1:
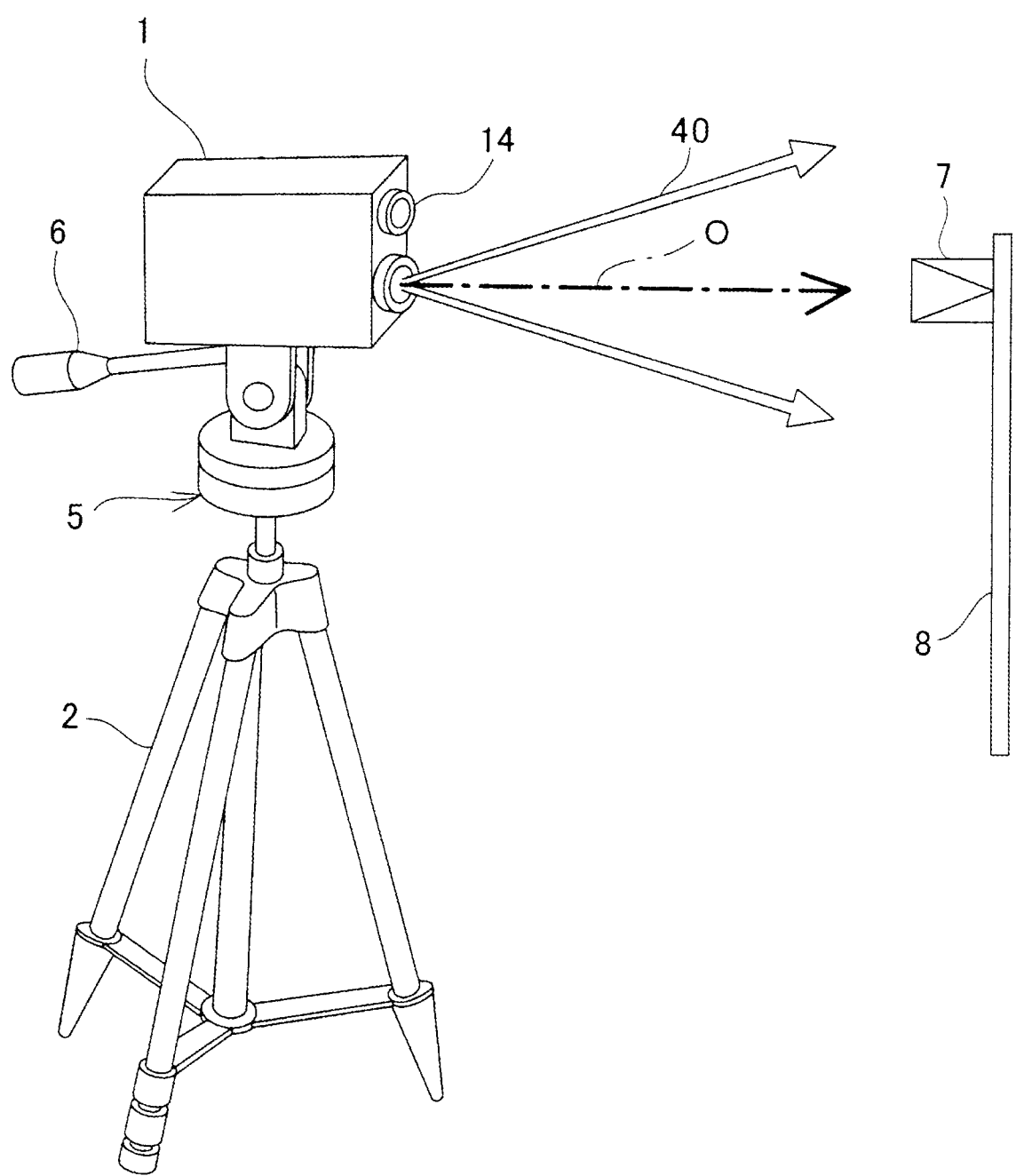
FIG. 1 is an external schematic view of a surveying instrument embodying the disclosure.

First, a surveying instrument 1 including a deflecting device according to a first embodiment of the disclosure will be described with reference to FIG. 1.

The surveying instrument 1 is installed with a tripod 2 being a supporting device. In the drawings, an optical axis, in an undeflected state, of the surveying instrument 1 (reference optical axis) is designated by O. In FIG. 1, a prism being a target or a measurement target object is designated by prism 7. The prism 7 is disposed in a predetermined position on a pole 8 (for example, at a known distance from the lower end).

The surveying instrument 1 is attached to the tripod 2 with a rotary table 5 therebetween. The rotary table 5 includes a lever 6. The operation of the lever 6 enables the surveying instrument 1 to rotate in an up-down direction (vertical direction) or a lateral direction (horizontal direction) and to be fixed in a specific attitude.

Figure 2:
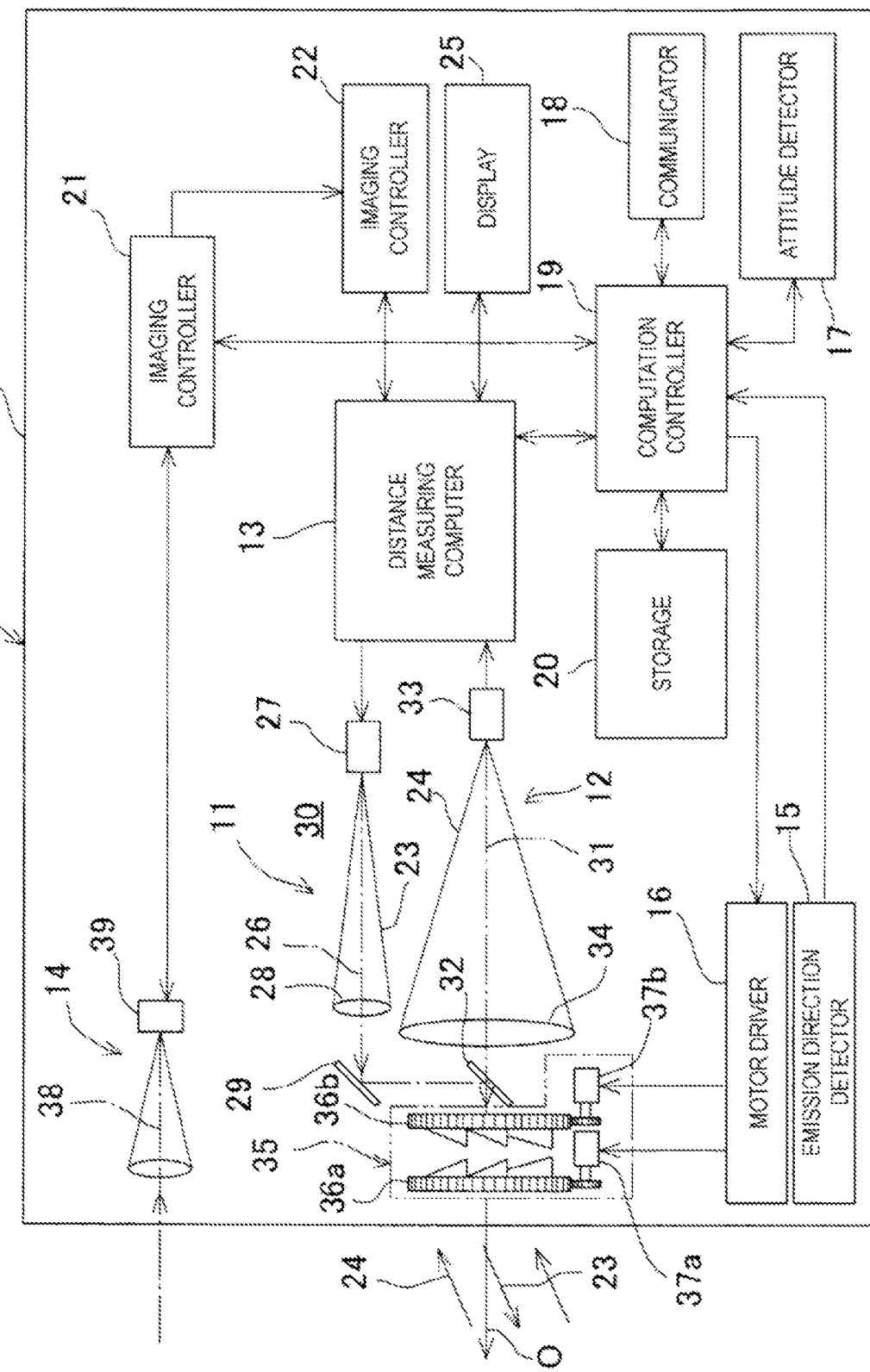
FIG. 2 is a schematic block diagram of a surveying instrument.

The surveying instrument 1 will be described with reference to FIG. 2.

The surveying instrument 1 includes a distance measuring light emitter 11, a receiver 12, a distance measuring computer 13, an imager 14, an emission direction detector 15, a motor driver 16, an attitude detector 17, a communicator 18, a computation controller 19, a storage 20, an imaging controller 21, an image processor 22, and a display 25. These are stored and integrated in a housing 9. The distance measuring light emitter 11, the receiver 12, the distance measuring computer 13, and the like constitute a distance meter 30.

The distance measuring light emitter 11 includes an emission optical axis 26. A light emitting element 27, such as a laser diode (LD), is disposed on the emission optical axis 26. A projection lens 28 is also disposed on the emission optical axis 26. Furthermore, a first reflection mirror 29 being an optical deflecting member is disposed on the emission optical axis 26, and a second reflection mirror 32 being an optical deflecting member is disposed on a reception light optical axis 31 of the receiver 12. The first reflection mirror 29 and the second reflection mirror 32 deflect the emission optical axis 26, so that the emission optical axis 26 coincides with the reception light optical axis 31. The first reflection mirror 29 and the second reflection mirror 32 constitute an emission optical axis deflector.

The light emitting element 27 sends out a pulse laser beam, and the distance measuring light emitter 11 emits the pulse laser beam sent out from the light emitting element 27, as distance measuring light 23.

The receiver 12 will be described. Reflected distance measuring light 24 from the measurement target object (that is, the prism 7) is incident on the receiver 12. The receiver 12 has the reception light optical axis 31. As described above, the emission optical axis 26 deflected by the first reflection mirror 29 and the second reflection mirror 32 coincides with the reception light optical axis 31. The state in which the emission optical axis 26 coincides with the reception light optical axis 31 is indicated by a distance measuring optical axis 40 (see FIG. 1).

An optical axis deflector 35 is disposed on the deflected emission optical axis 26, that is, the reception light optical axis 31. The straight optical axis passing through the center of the optical axis deflector 35 is the reference optical axis O. The reference optical axis O coincides with the emission optical axis 26 or the reception light optical axis 31 in a case of not being deflected by the optical axis deflector 35.

An imaging lens 34 and a light receiving element 33, such as a photodiode (PD), are disposed on the reception light optical axis 31 of the incident light passing through the optical axis deflector 35. The imaging lens 34 forms an image of the reflected distance measuring light 24 on the light receiving element 33.

The distance measuring light 23 emitted by the distance measuring light emitter 11 is deflected toward the measurement target object by the optical axis deflector 35 and illuminates the prism 7.

The reflected distance measuring light 24 reflected off the prism 7 is deflected by the optical axis deflector 35 so as to coincide with the reception light optical axis 31 and is incident on the receiver 12.

The imaging lens 34 forms an image of the reflected distance measuring light 24 on the light receiving element 33. The light receiving element 33 receives the reflected distance measuring light 24 and generates a light reception signal. The light reception signal is input to the distance measuring computer 13. The distance measuring computer 13 measures a distance to a measurement point on the basis of the light reception signal.

The imager 14 has an imaging optical axis 38 parallel with the reference optical axis O of the surveying instrument 1, is a camera having an angle of view greater than the maximum deflection angle (for example, ±20°) of the optical axis deflector 35, for example, an angle of view of 50°, and acquires image data including a measurement range of the surveying instrument 1. The positional relationships between the imaging optical axis 38 and the emission optical axis 26 and between the imaging optical axis 38 and the reference optical axis O are known. The imager 14 can also acquire a static image, a dynamic image, or continuous images.

An imaging element 39 of the imager 14 is a CCD or CMOS sensor, which is an assembly of pixels, and is configured so that the position of each of the pixels can be identified on the imaging element. For example, each of the pixels has pixel coordinates in a coordinate system having the imaging optical axis 38 as the origin, and the position of the pixel on the imaging element is identified with the pixel coordinates.

The emission direction detector 15 detects a deflection angle and a deflection direction of the distance measuring optical axis 40 deflected by the optical axis deflector 35 and inputs the detection result to the computation controller 19.

The motor driver 16 drives motors (described later) enabling deflection operation of the optical axis deflector 35, on the basis of a control signal from the computation controller 19.

The attitude detector 17 detects inclination of the surveying instrument 1 (the housing 9) with respect to the horizontal plane and inputs a detection signal to the computation controller 19. Note that the attitude detecting device disclosed in JP 2016-151423 A can be used as the attitude detector 17.

In a case that remote operation is performed with a remote controller (not illustrated), the communicator 18 can exchange data with the remote controller.

The storage 20 stores various pieces of data, such as the image acquired by the imager 14, distance measuring data from the distance measuring computer 13, data of the emission direction and data of the deflection angle acquired by the emission direction detector 15, and data of the inclination detected by the attitude detector 17.

The storage 20 also stores various programs, such as a measurement sequence program for performing measurement, a program for computing the emission direction of the optical axis deflector 35, and a correction program for correcting the distance measuring data on the basis of the inclination detection result from the attitude detector 17.

The computation controller 19 controls operations of the imager 14, the distance meter 30, the optical axis deflector 35, and the like. The computation controller 19 also performs distance measuring, performs image processing, computes the deflection angle of the emission direction, and corrects a distance measuring result in accordance with the programs stored in the storage 20.

The imaging controller 21 controls imaging at the imager 14. In a case where the imager 14 acquires a dynamic image or continuous images, the imaging controller 21 synchronizes the timing of acquiring frame images constituting the dynamic image or the continuous images and the timing of measurement at the surveying instrument 1. The computation controller 19 correlates the image with the distance measuring data.

The display 25 displays the image acquired by the imager 14, a measurement state, the distance measuring data, and the like. Note that the display 25 is a touch panel and also functions as an operating section.

The optical axis deflector 35 will be described.

The optical axis deflector 35 includes a pair of prism deflection plates 36a, 36b and deflection motors 37a, 37b configured to rotate the prism deflection plates 36a, 36b separately.

The prism deflection plates 36a, 36b are parallel with each other. The prism deflection plates 36a, 36b each have an axis center coinciding with the reference optical axis O. The prism deflection plates 36a, 36b rotate about the reference optical axis O.

Each of the prism deflection plates 36a, 36b includes, as an optical deflecting member (described later), a plurality of rod-shaped optical prisms arranged parallel with each other. Each of the optical prisms is an optical glass member having a triangular (wedge-shaped) cross section, and all of the optical prisms have the same refractive properties.

The rotation position of each of the prism deflection plates 36a, 36b and the relative rotation angle between the prism deflection plates 36a, 36b determine the deflection direction and the deflection angle of the distance measuring optical axis 40 passing through the prism deflection plates 36a, 36b. Thus, control of the rotation position of each of the prism deflection plates 36a, 36b allows the distance measuring optical axis 40 to be deflected toward the measurement target object in a freely selected position, thereby enabling distance measurement and angle measurement of the measurement target object.

Furthermore, in a case where the prism deflection plates 36a, 36b are rotated separately while the distance measuring light 23 is emitted, scanning with the distance measuring light 23 can be performed in a freely-selected pattern. In a case where a distance is measured at each pulse, point group data can be acquired along a scanning path, thereby enabling measurement as a laser scanner.

Next, the optical axis deflector 35 according to a first embodiment of the disclosure will be described in detail with reference to FIGS. 3 to 6.

The prism deflection plates 36a, 36b are disposed on both lateral sides of a rotary bearing holder 41 being a ring-shaped holding member.

The prism deflection plate 36a and the prism deflection plate 36b have the same structure, and thus the prism deflection plate 36a will be described below.

The rotary bearing holder 41 includes rotary bearing fitting cavities 42 formed by recessing both sides of the rotary bearing holder and a rotary bearing receiving protrusion 43 formed at the center of the inner periphery and having a rectangular cross section, thereby serving as outer ring fitting sections. An attachment flange 44 is formed on the outer periphery of the rotary bearing holder 41.

A rotary bearing 45 is fitted into each of the rotary bearing fitting cavities 42, and the outer ring of the rotary bearing 45 comes into contact with the rotary bearing receiving protrusion 43. The outer peripheral surface of the outer ring is bonded to the inner peripheral surface of the rotary bearing fitting cavity 42, and a side surface of the outer ring is bonded to a side surface of the rotary bearing receiving protrusion 43. The outer ring of the rotary bearing 45 is thus fixed to the rotary bearing holder 41.

A ring gear 46 is disposed concentric with the rotary bearing holder 41 and facing the rotary bearing holder 41. The ring gear 46 is a timing pulley having an outer peripheral surface engraved with gear teeth. A circular groove concentric with the ring gear 46 is engraved on a side surface (inner side surface) of the ring gear 46 closer to the rotary bearing holder 41. The inner edge of the circular groove serves as an inner ring fitting section. Furthermore, the inner ring fitting section serves as a shaft 47 fitted with the inner ring of the rotary bearing 45. A gap 48 is formed on the periphery of the outer ring of the rotary bearing 45. The ring gear 46 thus does not come into contact with the outer ring of the rotary bearing 45.

The shaft 47 is bonded to the inner ring of the rotary bearing 45. The inner ring and the ring gear 46 are thus fixed to each other and rotate together.

The circular groove engraved on the ring gear 46 allows the inner edge of the ring gear 46 to protrude in a ring shape. In addition, the inner edge serving as the shaft 47 allows the ring gear 46 to be supported by the rotary bearing 45 rotatably without additionally forming a shaft on the ring gear 46, that is, without increasing the shaft length (thickness) of the ring gear 46. Furthermore, the rotary bearing 45 is partially stored in the circular groove, so that the shaft length (thickness) of the prism deflection plate 36a can be significantly short.

An optical deflecting member is disposed inside the inner ring of the rotary bearing 45. The optical deflecting member is constituted by a plurality of optical prisms 50, 51, 52. The number is an odd number (three in the drawings). Each of the optical prisms 50, 51, 52 is a rod-shaped optical member extending perpendicular to the paper in the drawings, and the three optical prisms 50, 51, 52 are arranged parallel with each other. The optical prisms 50, 51, 52 are typically made from optical glass.

The outer shape of the optical prisms 50, 51, 52 as a whole is a circle fitted into the inner ring of the rotary bearing 45. Each of the optical prisms 50, 51, 52 is bonded to one or both of an end surface of the shaft 47 and the inner ring of the rotary bearing 45. The optical prisms 50, 51, 52 are thus integrated with the ring gear 46.

The optical prisms 50, 51, 52 are directly fitted into the inner ring of the rotary bearing 45, so that the thickness of the optical prisms 50, 51, 52 partially overlaps with the thickness of the rotary bearing 45. Thus, the shaft length of the prism deflection plate 36a including the optical prisms 50, 51, 52 can be significantly short.

The number and size of the optical prisms 50, 51, 52 are not particularly limited to a specific number and size. However, the width (the height in FIG. 7A) of the central optical prism 51, through which the axis of the prism deflection plate 36a, that is, the reference optical axis O passes, is preferably greater than the diameter of a pencil of the distance measuring light 23 to prevent the pencil of the distance measuring light 23 from splitting.

In the above description, the optical prisms are made from optical glass. However, only the central portion where the distance measuring light 23 passes through may be made from optical glass, and the other portion where the reflected distance measuring light 24 is incident may be constituted by a Fresnel lens made from synthetic resin.

A motor substrate 55 is fastened to a side surface of the attachment flange 44 closer to the prism deflection plate 36a (the left side surface in FIG. 4), and the deflection motor 37a is attached to the motor substrate 55.

A driving timing pulley 57 is fastened to an output shaft 56 of the deflection motor 37a. A timing belt 58 is wound around the driving timing pulley 57 and the ring gear 46. The driving timing pulley 57 has a smaller diameter than that of the ring gear 46, and they have a known gear ratio.

The attachment flange 44 is fixed to a structural member supporting the optical axis deflector 35. For example, the attachment flange 44 is fixed to the housing 9. Thus, the rotary bearing holder 41 is supported by the structural member, and the prism deflection plates 36a, 36b are rotatably supported by the rotary bearing holder 41 with the rotary bearings 45, 45 therebetween.

A ring-shaped magnetic member 59, for example, a ring-shaped iron plate, concentric with the ring gear 46 is fixed to a side surface, not facing the prism deflection plate 36b, of the ring gear 46 (a surface orthogonal to the axis of the ring gear 46) by a prescribed method, for example, adhesion. Furthermore, a ring-shaped protractor 61 concentric with the magnetic member 59 is fixed to the ring gear 46 at the outer periphery of the magnetic member 59 by a prescribed method, for example, adhesion.

Figure 3:
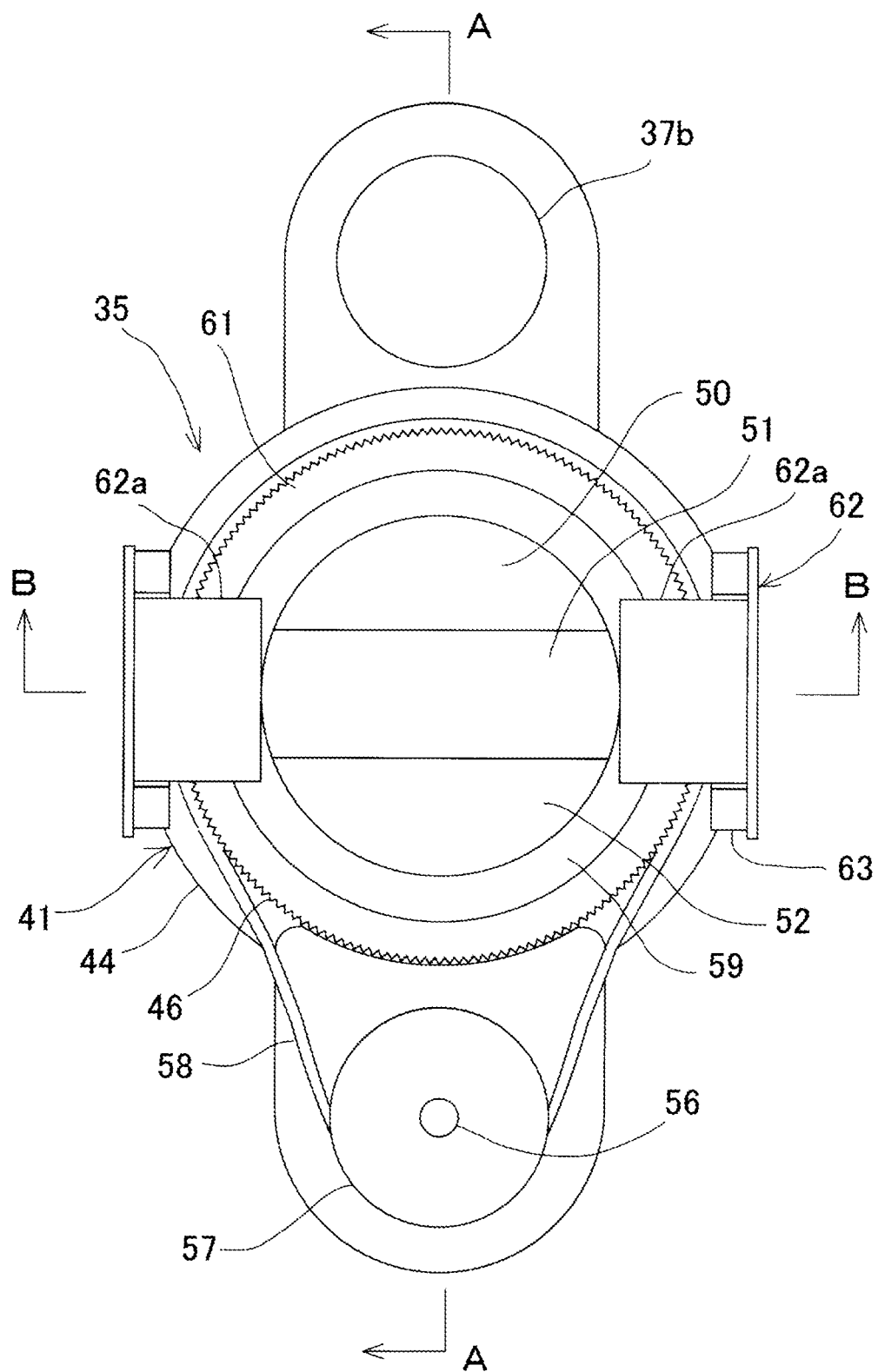
FIG. 3 is a front view of a deflecting device according to a first embodiment of the disclosure.
Figure 4:
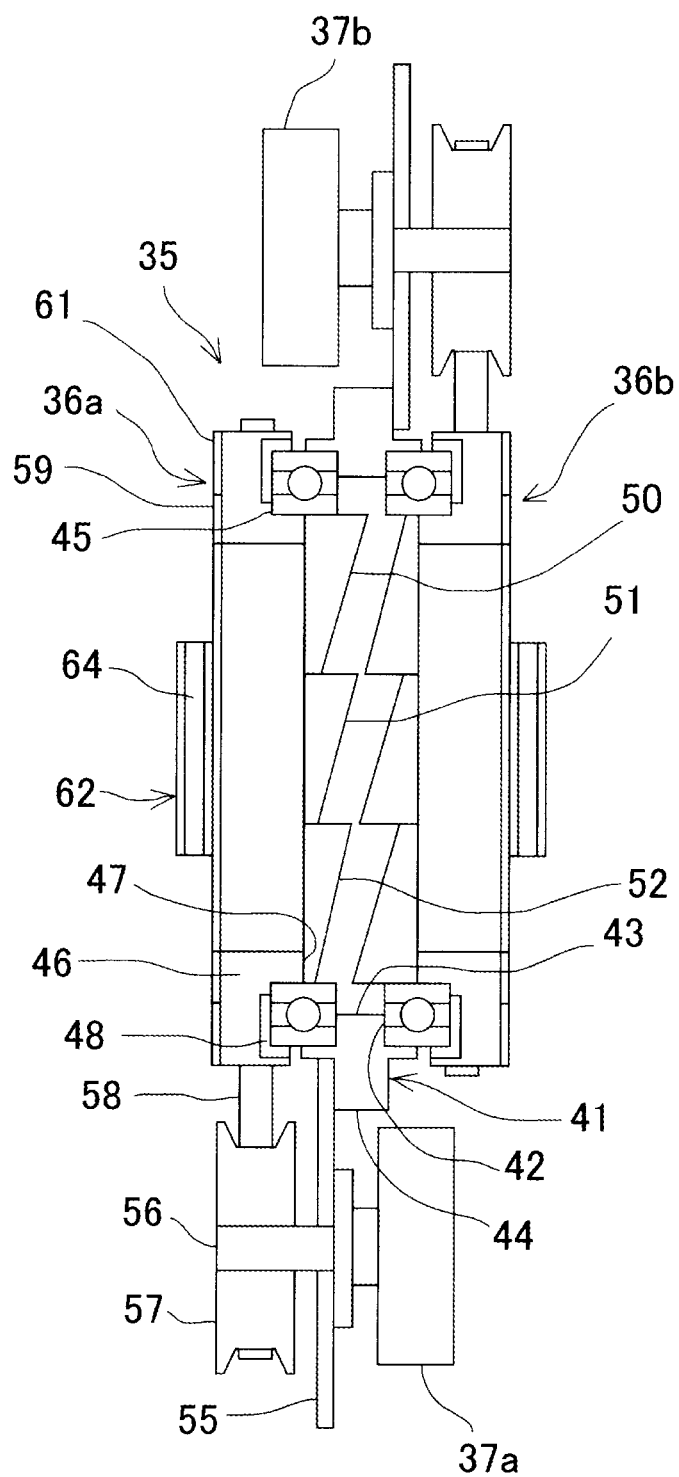
FIG. 4 is a view taken along the line A-A of FIG. 3.
Figure 5:
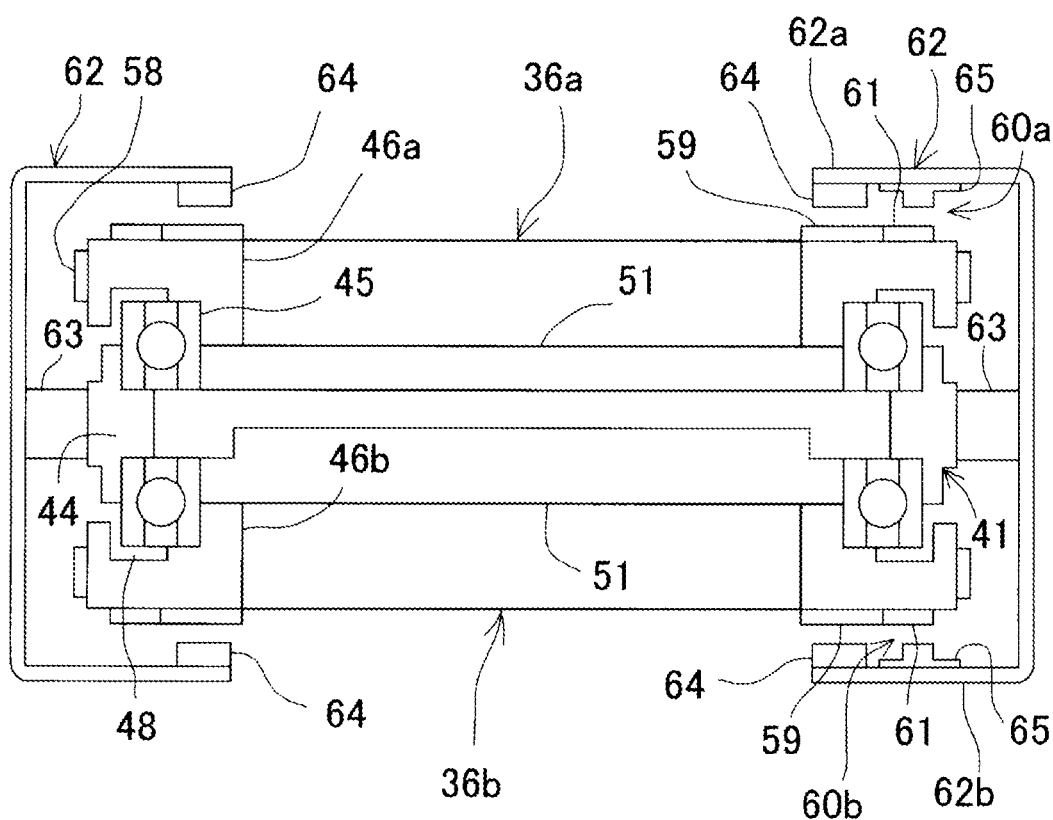
FIG. 5 is a view taken along the line B-B of FIG. 3.

Supporting plates 62 are disposed in portions of an end surface of the attachment flange 44 that do not interfere with the motor substrate 55 and the deflection motors 37a, 37b (for example, right and left portions in the paper in FIG. 3). The supporting plates 62 are disposed in two opposing positions and are plate-shaped members bent so as to have a U-shaped cross section. Each of the supporting plates 62 is fixed to the attachment flange 44 with a spacer 63 so that a gap having a predetermined interval is formed between the supporting plate 62 and the peripheral surface of the attachment flange 44.

The supporting plate 62 includes an extending portion 62a extending parallel with a side surface of the ring gear 46a of the prism deflection plate 36a and an extending portion 62b extending parallel with a side surface of the ring gear 46b of the prism deflection plate 36b. A gap having a predetermined interval is formed between the side surface of the ring gear 46a and the extending portion 62a, and a gap having a predetermined interval is formed between the side surface of the ring gear 46b and the extending portion 62b. Note that the extending portions 62a, 62b do not overlap with the optical prisms 50, 51, 52 and do not block the distance measuring light 23 and the reflected distance measuring light 24.

A magnet 64 is disposed in a portion, facing the magnetic member 59, of the extending portion 62a. Furthermore, an angle measuring sensor 65 configured to read a value of the protractor 61 is disposed in a portion, facing the protractor 61, of the extending portion 62a. The protractor 61 and the angle measuring sensor 65 constitute an encoder 60a, and the magnetic member 59 and the magnet 64 constitute an urging member. Note that the angle measuring sensor 65 may be disposed on one of the extending portions 62a.

The arrangement of the magnetic member 59 and the number of magnets 64 are determined so that magnetic force acting between the magnetic member 59 and the magnets 64 urges the prism deflection plate 36a in a direction parallel with the rotation axis of the ring gear 46 and separating from (or approaching) the prism deflection plate 36b. Urging the ring gear 46 allows the inner ring of the rotary bearing 45 to be pressed against the outer ring.

Similarly, the extending portion 62b is provided with the magnet 64 to constitute an urging member and the angle measuring sensor 65 to constitute an encoder 60b.

Thus, pressure is applied to the rotary bearing 45 of the prism deflection plate 36a and the rotary bearing 45 of the prism deflection plate 36b by the respective urging members, thereby preventing rattling. Furthermore, the encoders 60a, 60b detect rotation of the prism deflection plates 36a, 36b separately.

When the deflection motor 37a is driven, the driving timing pulley 57 rotates through the output shaft 56, and the rotation of the driving timing pulley 57 is transmitted to the ring gear 46. Furthermore, since the driving timing pulley 57 has a smaller diameter than that of the ring gear 46, the rotation is decelerated when transmitted.

The prism deflection plate 36b has a configuration symmetrical to that of the prism deflection plate 36a; thus, descriptions thereof will be omitted. Furthermore, the deflection motors 37a, 37b and the driving timing pulleys 57 are positioned at an angle of 180° to the axis of the optical axis deflector in FIGS. 3 and 4, but are only required to be in such positions as not to interfere with other members and may be positioned at an angle of 90° or 60°.

Figure 6:
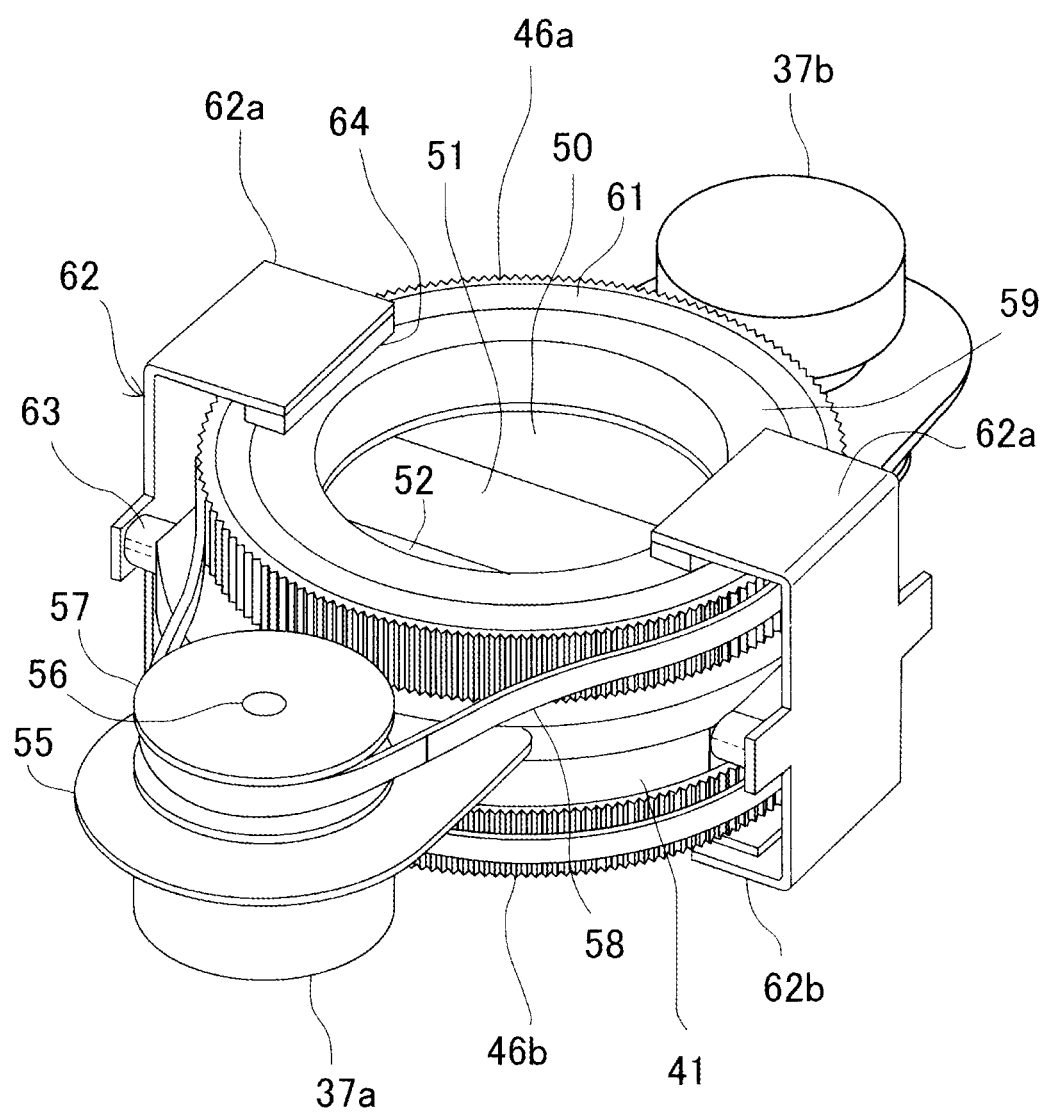
FIG. 6 is a perspective view of a deflecting device according to the first embodiment of the disclosure.

The supporting plates 62 are disposed in the two opposing positions, that is, at an angular interval of 180° in FIGS. 3 and 6; however, as long as the supporting plates 62 do not interfere with the motor substrates 55 and are arranged at regular angular intervals, three supporting plates may be disposed at angular intervals of 120°, or four supporting plates may be disposed at angular intervals of 90°.

As described above, the prism deflection plate 36a is rotatably supported by the attachment flange 44, and similarly, the prism deflection plate 36b is rotatably supported by the attachment flange 44. This configuration allows the prism deflection plates 36a, 36b to rotate freely without mutual interference.

In the present embodiment, the deflection motors 37a, 37b are controlled on the basis of detection signals from the angle measuring sensors 65 (the encoders 60a, 60b) to control rotation angles, rotation speeds, and the like of the prism deflection plates 36a, 36b. However, an encoder may be attached to each of the deflection motors 37a, 37b. On the basis of a detection signal from the encoder, a rotation angle of the corresponding prism deflection plates 36a, 36b may be detected, and furthermore, a rotation speed and the like may be controlled. Alternatively, pulse motors may be used as the deflection motors 37a, 37b, and drive pulse numbers applied to the pulse motors may be controlled to control rotation, or rotation angles may be detected with the pulse numbers.

Separate control of the deflection motors 37a, 37b enables the prism deflection plates 36a, 36b to be rotated separately in freely-selected directions at freely-selected rotation speeds and the distance measuring optical axis 40 to be deflected in a freely-selected direction at a freely-selected speed.

Transmission of rotation with the timing belt 58 results in less backlash than the case in which gears mesh directly with each other, and rotation is decelerated when transmitted from the driving timing pulley 57 to the ring gear 46. Thus, the resolution and rotation accuracy of rotary drive of the deflection motor 37a can be enhanced.

The magnetic members 59, 59 are disposed on the side surfaces of the ring gears 46a, 46b, and the magnets 64, 64 are disposed facing the magnetic members 59, 59. This configuration provides attraction acting between the magnetic members 59, 59 and the magnets 64, 64 and urges the prism deflection plates 36a, 36b in the mutually separating (or approaching) directions. Thus, pressure is applied between the inner rings and between the outer rings of the rotary bearings 45, so that the ring gears 46a, 46b are prevented from rattling during rotation and can stably rotate with high accuracy.

Since the magnets 64, 64 are disposed at regular angular intervals, magnetic force acts equally on the ring gears 46a, 46b, resulting in rotation with higher accuracy.

In a case where the maximum deflection angle of the optical axis deflector 35 is determined to be ±20° as described above, 180° rotation of one prism deflection plate 36a provides a maximum deflection angle of 20°. Thus, a rotation error of the prism deflection plate 36a is ⅑ in terms of an error in the deflection angle. Accordingly, the deflection angle is controlled with high accuracy.

The timing pulley and the timing belt are used as a drive transmitting member for rotating the ring gear 46. However, instead of the timing pulley and the timing belt, a pinion gear being the drive transmitting member may be meshed with the ring gear 46, and the ring gear 46 may be rotated directly with the pinion gear through gear connection. This case also reduces an error, such as backlash, and thus yields high deflection angle accuracy.

Next, action of the optical axis deflector 35 will be described.

The computation controller 19 can control various types of deflecting action of the optical axis deflector 35 through control of the rotation directions and rotation speeds of the deflection motors 37a, 37b and the rotation ratio between the deflection motors 37a, 37b, normal and reverse rotation of the deflection motors 37a, 37b, and the like.

The emission direction detector 15 detects the rotation angles of the deflection motors 37a, 37b on the basis of signals from the encoders 60a, 60b. Alternatively, the emission direction detector 15 detects the rotation angles of the deflection motors 37a, 37b by counting drive pulses input to the deflection motors 37a, 37b. The emission direction detector 15 also computes the rotation positions of the prism deflection plates 36a, 36b on the basis of the rotation angles of the deflection motors 37a, 37b. In addition, the emission direction detector 15 computes the deflection angle and emission direction of the distance measuring light 23 for each pulsed light on the basis of the refractive index of the optical prisms 50, 51, 52 and the rotation positions of the prism deflection plates 36a, 36b. The computation result is correlated with a distance measuring result and input to the computation controller 19.

The horizontal angle and vertical angle at the measurement point are computed from the deflection angle and emission direction of the distance measuring light 23, and the horizontal angle and vertical angle are correlated with the distance measuring data for the measurement point, thereby acquiring three-dimensional data of the measurement target object.

While the prism deflection plates 36a, 36b are continuously rotated, for example, at varying rotation speeds or in the normal and reverse directions, by controlling drive of the deflection motors 37a, 37b, the distance measuring light 23 is emitted. In this way, scanning with the distance measuring light 23 can be performed in various scanning modes.

The deflecting action and scanning action of the optical axis deflector 35 will be described with reference to FIGS. 7A, 7B, and 7C.

Figure 7A:
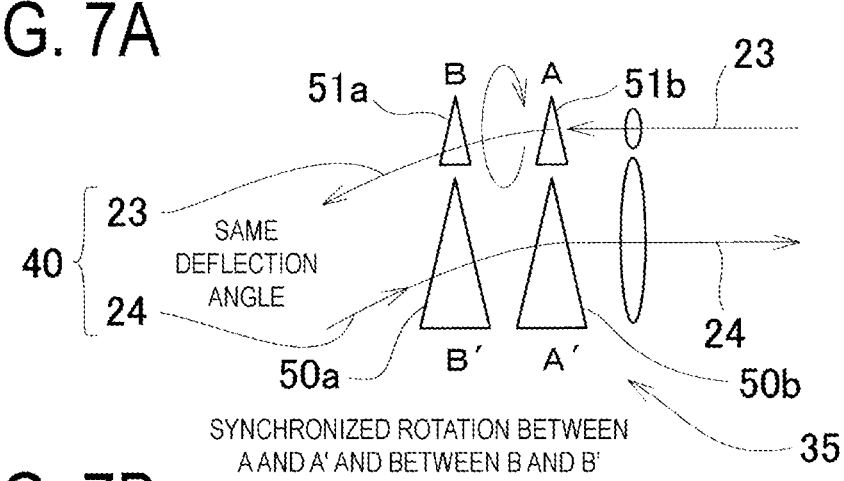
FIGS. 7A to 7C are explanatory diagrams of action of a deflecting device according to an embodiment of the disclosure.
Figure 7B:
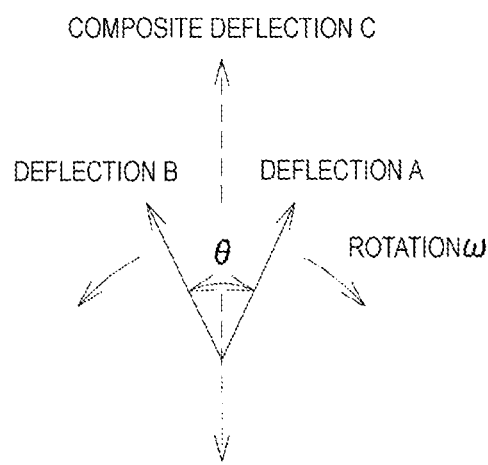
Figure 7C:
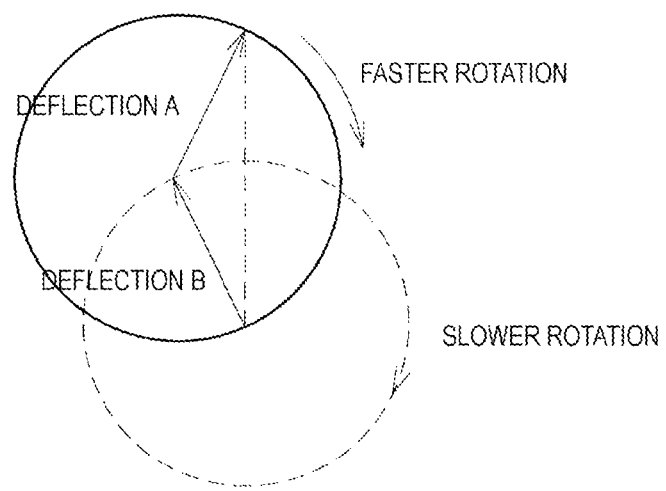

Note that in FIGS. 7A, 7B, and 7C, the optical prisms of the prism deflection plate 36a are designated by 50a and 51a, and the optical prisms of the prism deflection plate 36b are designated by 50b and 51b. The optical prism 52 is similar to the optical prism 50, and descriptions thereof will be thus omitted.

In FIG. 7A, to simplify the description, the optical prisms 50 and the optical prisms 51 of the prism deflection plates 36a, 36b are separated from each other. FIG. 7A illustrates the state in which the optical prisms 50a, 51a of the prism deflection plates 36a and the optical prisms 50b, 51b of the prism deflection plate 36b are positioned in the same direction. In this state, the maximum deflection angle (for example, ±20°) is acquired. The minimum deflection angle is acquired in the state in which either one of the prism deflection plates 36a, 36b rotates 180°. In this state, optical action of the optical prisms 50a, 51a of the prism deflection plates 36a and optical action of the optical prisms 50b, 51b of the prism deflection plate 36b are offset, resulting in a deflection angle of 0°. Thus, the optical axis (the distance measuring optical axis 40) of a pulse laser beam emitted or received through the prism deflection plates 36a, 36b coincides with the reference optical axis O.

The distance measuring light 23 is emitted from the light emitting element 27, is made to be a parallel pencil by the projection lens 28, passes through the optical prisms 51a, 51b, and is emitted toward the prism 7. The distance measuring light 23 is deflected in a specific direction by the optical prisms 51a, 51b and then emitted (FIG. 7A).

The reflected distance measuring light 24 reflected off the prism 7 is incident on the imaging lens 34 through the optical prisms 50a, 50b and is concentrated at the light receiving element 33.

When the reflected distance measuring light 24 passes through the optical prisms 50a, 50b, the optical axis of the reflected distance measuring light 24 is deflected so as to coincide with the reception light optical axis 31 (FIG. 7A).

A combination of the rotation positions of the prism deflection plate 36a and the prism deflection plate 36b can freely vary the deflection direction and deflection angle of the emitted distance measuring light.

In a case where the deflection motors 37a, 37b rotate the prism deflection plate 36a and the prism deflection plate 36b together as one while the positional relationship between the prism deflection plate 36a and the prism deflection plate 36b is fixed, the distance measuring light 23 passing through the optical prisms 51a, 51b draws a path shaped into a circle centered on the distance measuring optical axis 40.

Thus, in a case where the optical axis deflector 35 is rotated while the light emitting element 27 emits a laser beam, scanning with the distance measuring light 23 can be performed along a circular path. It should be understood that the prism deflection plates 36a, 36b are rotated together as one.

Next, FIG. 7B illustrates the case in which the prism deflection plate 36a and the prism deflection plate 36b are rotated relatively. When the deflection direction of the optical axis deflected by the prism deflection plate 36a is represented by deflection A and the deflection direction of the optical axis deflected by the prism deflection plate 36b is represented by deflection B, the deflection of the optical axis deflected by the prism deflection plates 36a, 36b is composite deflection C with an angular difference θ between the prism deflection plates 36a, 36b.

Thus, in a case where the prism deflection plate 36a and the prism deflection plate 36b perform to-and-fro rotational oscillation at a uniform speed while being synchronized with each other in mutually different directions, the distance measuring light 23 passing through the prism deflection plates 36a, 36b enables linear scanning. In this way, to-and-fro rotational oscillation of the prism deflection plate 36a and the prism deflection plate 36b in mutually different directions at a uniform speed enables to-and-fro scanning with the distance measuring light along a linear path in the direction of the composite deflection C, as illustrated in FIG. 7B.

Furthermore, as illustrated in FIG. 7C, in a case where the prism deflection plate 36b is rotated at a slower rotation speed than the rotation speed of the prism deflection plate 36a, scanning with the distance measuring light 23 is performed while the angular difference θ increases gradually, resulting in a spiral path of the distance measuring light 23.

As described above, in a case where the rotation directions and rotation speeds of the prism deflection plate 36a and the prism deflection plate 36b are controlled separately, various scanning patterns are acquired. For example, a direction of the scanning path of the distance measuring light 23 can be in an illumination direction with the reference optical axis O being the center (scanning in a radial direction), or in a horizontal or vertical direction.

In a case where distance measuring data and angle measurement data are acquired at each pulse during scanning with the distance measuring light 23, point group data can be acquired. This indicates that the surveying instrument 1 of the present embodiment can be used as a laser scanner.

In the present embodiment, in a case where the pole 8 is moved and installed at another measurement point, collimation toward the prism 7 can be performed only by rotating the prism deflection plates 36a, 36b without rotating the surveying instrument 1. Thus, collimation toward the other measurement point can be performed promptly.

In the present embodiment, the distance measuring optical axis 40 can be deflected at high speed in two directions, horizontally and vertically, and continuous scanning can be performed at high speed in a freely-selected pattern. Furthermore, change of a scanning pattern enables various types of measurement, for example, scanning in different densities and scanning with the optical axis fixed to a specific measurement point.

Figure 8:
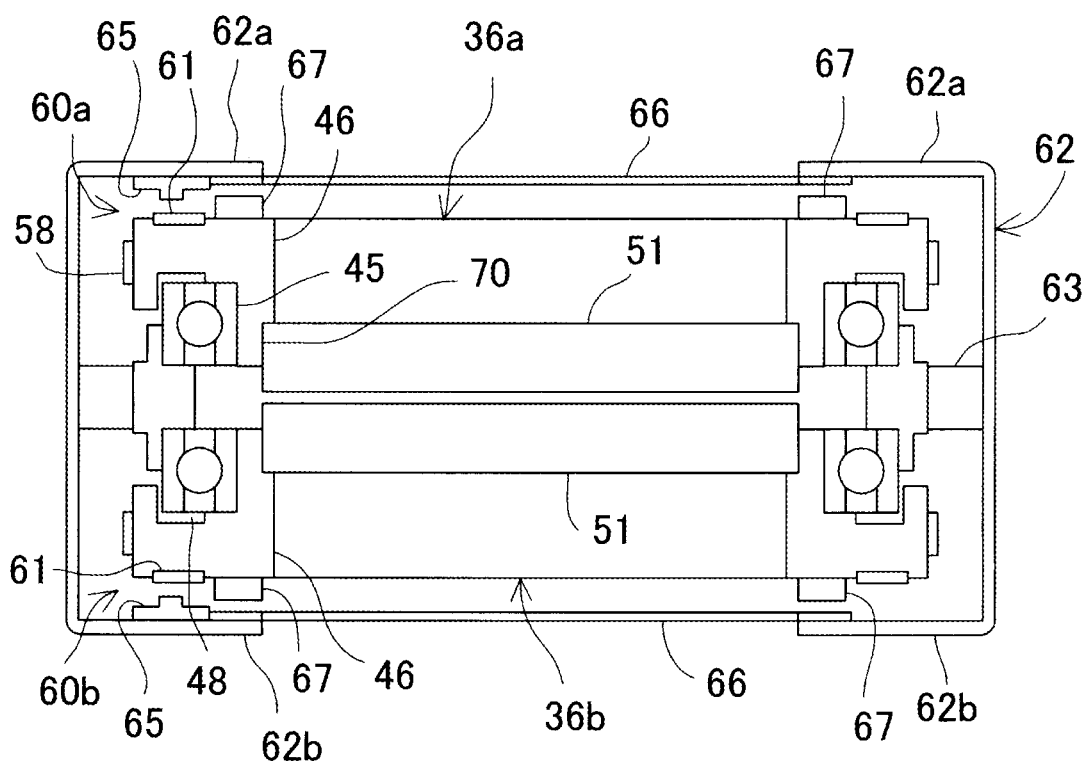
FIG. 8 is a view, corresponding to the view taken along the line B-B of FIG. 3, according to a modified example of the first embodiment.
Figure 9:
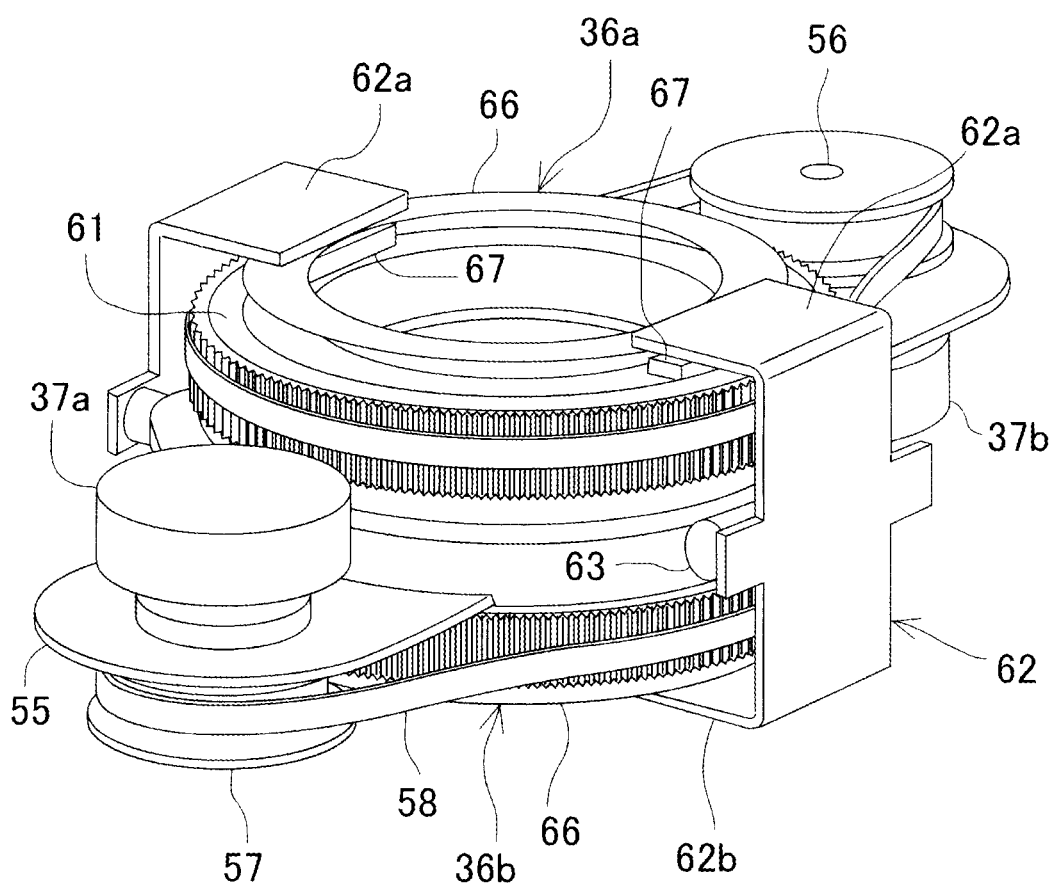
FIG. 9 is a perspective view of a deflecting device according to a modified example of the first embodiment.

The optical axis deflector 35 can be modified in various ways. FIGS. 8 and 9 illustrate a modified example of the first embodiment.

In this modified example, a ring-shaped magnetic member 66 is disposed across the two facing extending portions 62a, 62a. The magnetic member 66 is concentric with the ring gear 46. Magnets 67 are disposed in two positions on a side surface of the ring gear 46 while facing the magnetic member 66. Note that the magnets 67 are disposed in two positions in the modified example but may be disposed in three or more positions at regular angular intervals. For example, the magnets 67 may be disposed in three positions at angular intervals of 120° or in four positions at angular intervals of 90°.

In the first embodiment, the optical prisms 50, 51, 52 are directly fitted with the inner ring of the rotary bearing 45. In the modified example, a fitting recess portion 70 is formed in the ring gear 46, and the optical prisms 50, 51, 52 are fitted into the fitting recess portion 70.

Similar to the first embodiment, in the above-described modified example, magnetic force acting between the magnets 67 and the magnetic member 66 urges the prism deflection plate 36a to separate from (or approach) the prism deflection plate 36b (or the prism deflection plate 36b to separate from (or approach) the prism deflection plate 36a) parallel with the rotation axis of the ring gear 46. Thus, the ring gear 46 is prevented from rattling during rotation and can stably rotate with high accuracy.

Next, a second embodiment of the disclosure will be described with reference to FIGS. 10 to 13. Note that the same reference signs are appended in FIGS. 10 to 13 to equivalent parts to those of FIGS. 3 to 6, and descriptions thereof will be omitted.

In the second embodiment, a ring-shaped magnetic member 68, for example, a ring-shaped iron plate is disposed on a peripheral edge, closer to the attachment flange 44, of the outer peripheral surface of each of the ring gears 46 and parallel with the rotary bearing holder 41 while protruding toward the outer periphery. The magnetic member 68 may be fitted with the ring gear 46 or fixed to the ring gear 46 with a screw.

Figure 10:
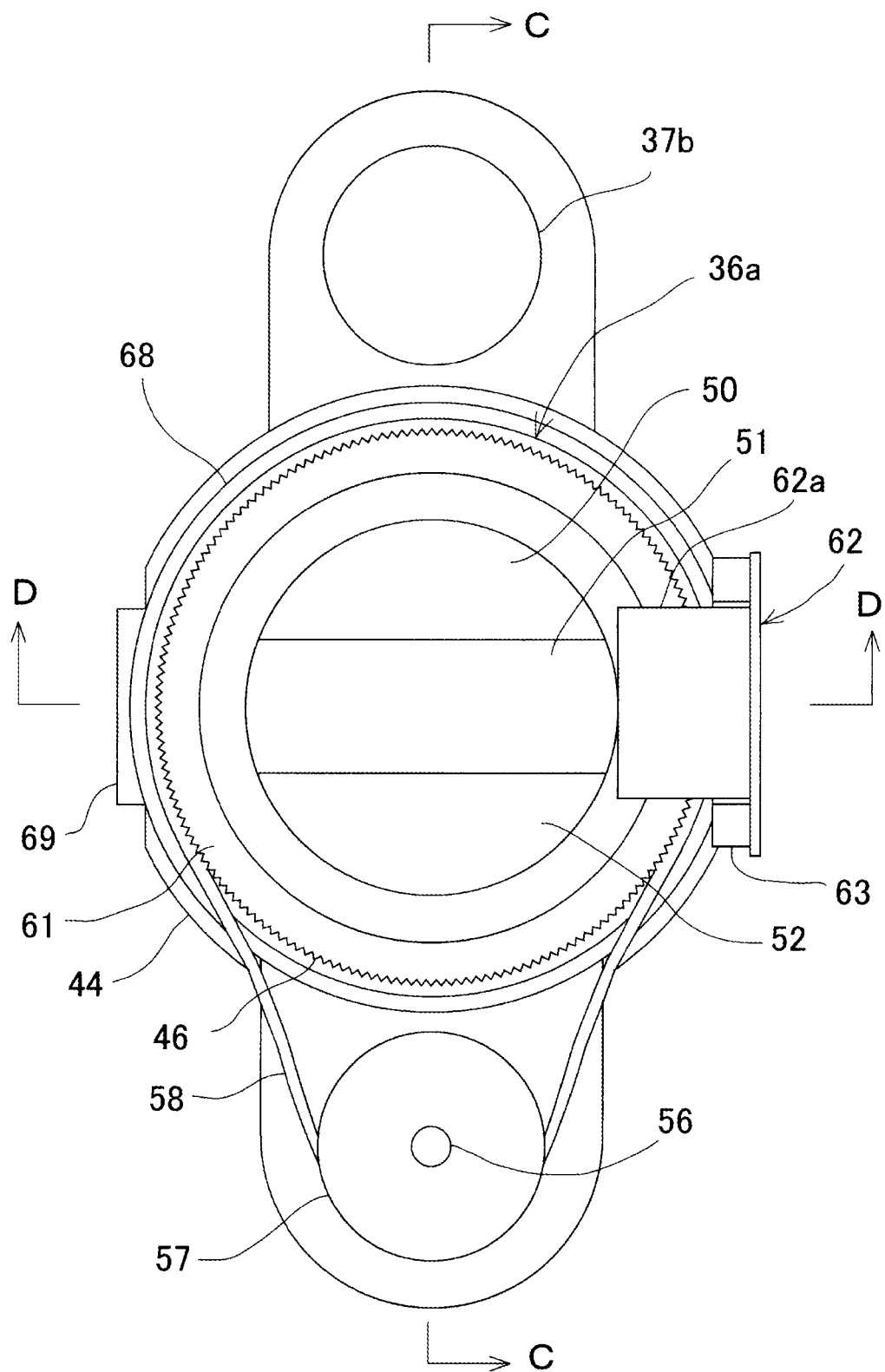
FIG. 10 is a front view of a deflecting device according to a second embodiment of the disclosure.
Figure 11:
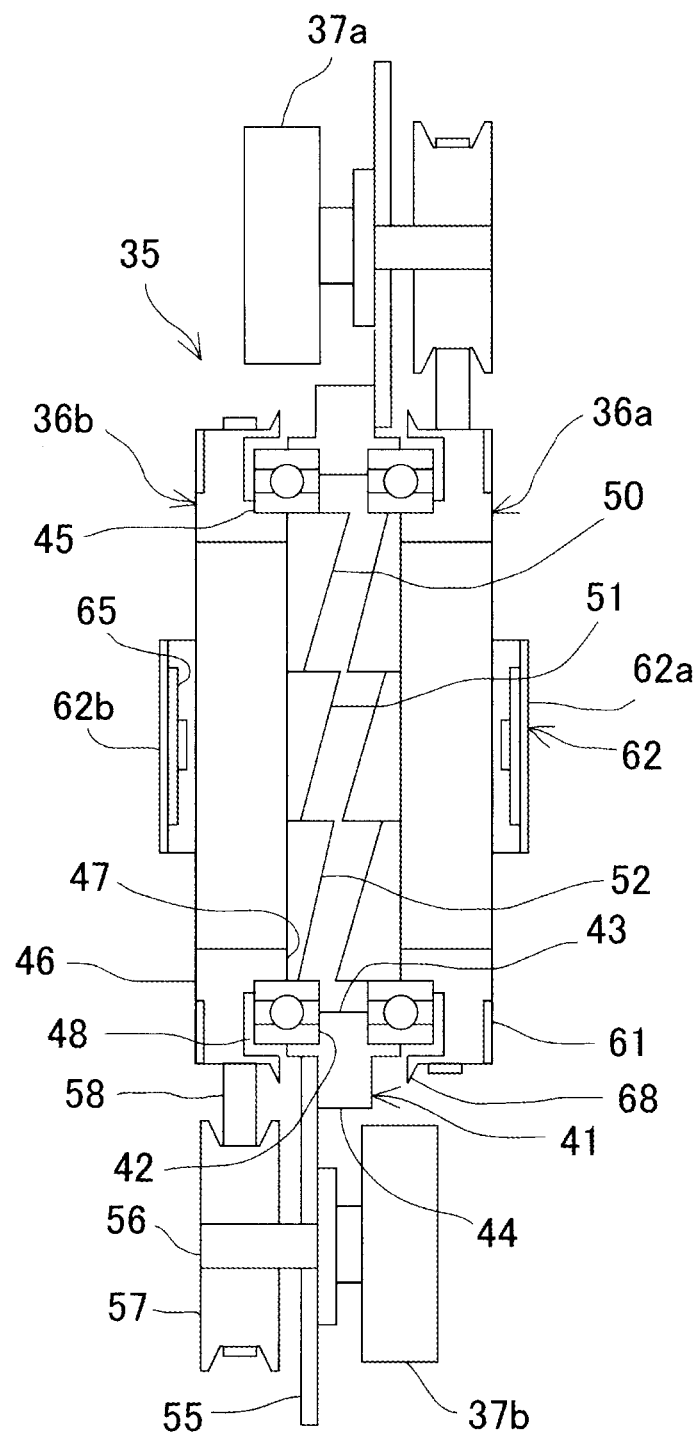
FIG. 11 is a view taken along the line C-C of FIG. 10.
Figure 12:
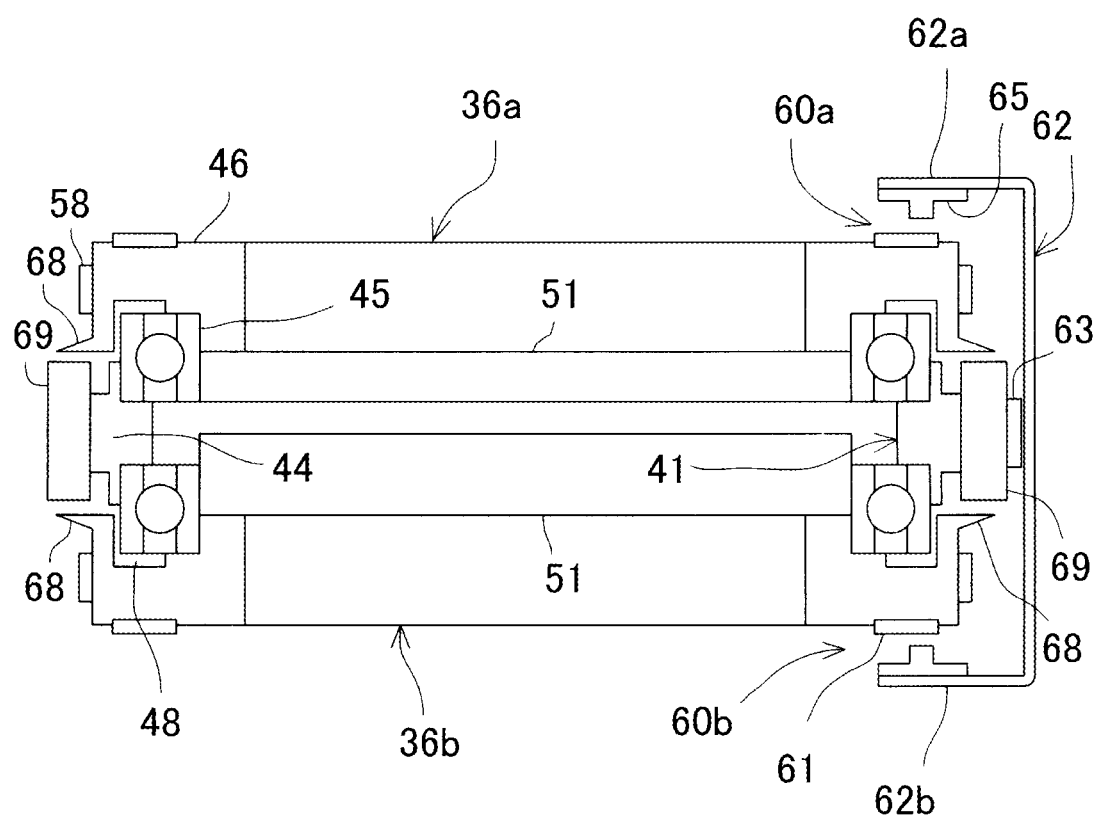
FIG. 12 is a view taken along the line D-D of FIG. 10.
Figure 13:
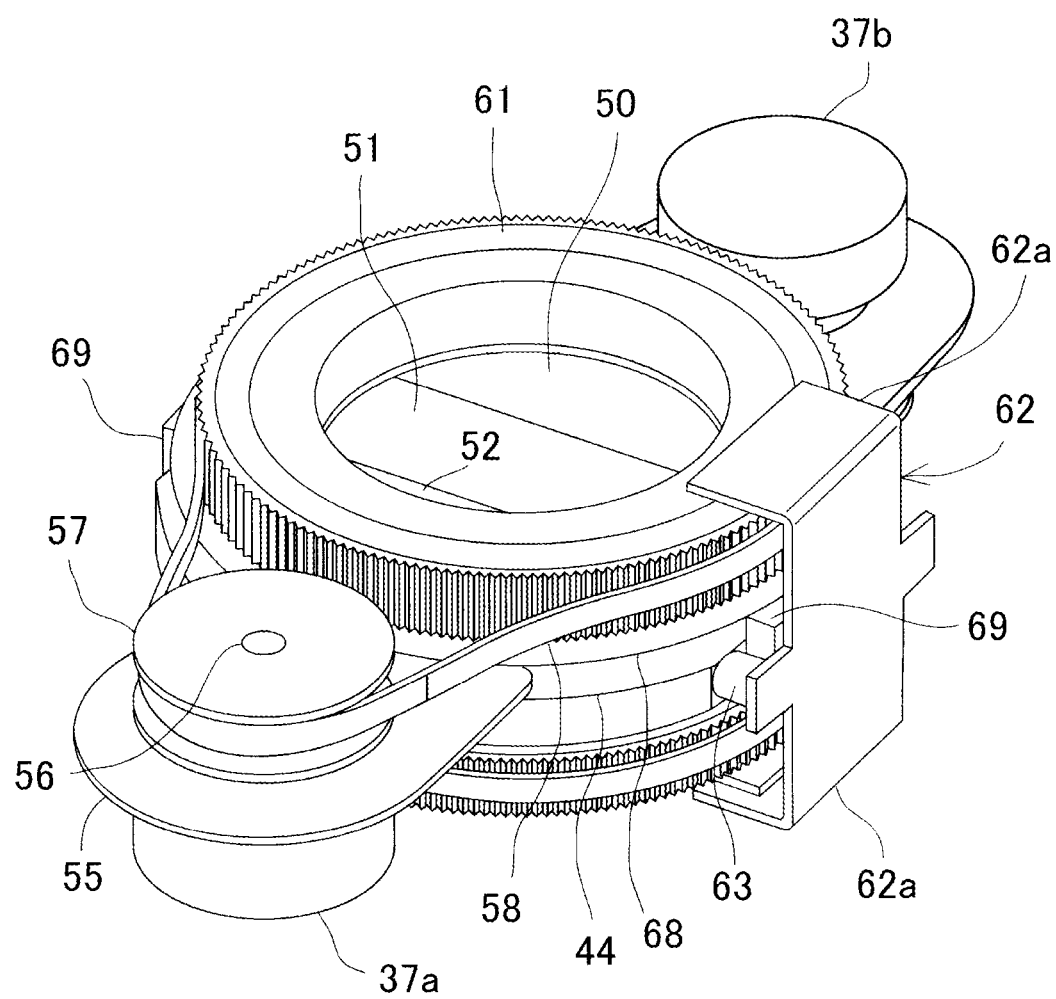
FIG. 13 is a perspective view of a deflecting device according to the second embodiment of the disclosure.

Magnets 69 are disposed in two positions of the outer peripheral surface of the attachment flange 44 that do not interfere with the motor substrates 55 and the deflection motors 37a, 37b (for example, lateral positions in the paper in FIGS. 10 and 12). The magnets 69 are arranged symmetric with respect to the center. Each of the magnets 69 is disposed between the magnetic members 68, 68 with a predetermined interval between both end surfaces of the magnet 69 and the above and below magnetic members 68.

The intervals between the magnetic members 68 and the magnet 69 are preferably as small as possible without contact between the magnetic members 68 and the magnet 69. Magnetic force between the magnetic members 68 and the magnet 69 exerts attraction, and pressure is applied to the rotary bearing 45 in the axial direction, resulting in prevention of rattling of the rotary bearing 45.

As described above, the magnetic members 68 are disposed on the peripheral edges of the ring gears 46, and the magnets 69 are disposed on the peripheral surface of the attachment flange 44. With this configuration, magnetic force acting between the magnetic members 68 and the magnets 69 urges the prism deflection plates 36a, 36b in the mutually approaching (or separating) directions. Thus, pressure is applied between the inner rings and between the outer rings of the rotary bearings 45 in the axial direction, and the prism deflection plates 36a, 36b are prevented from rattling during rotation and can stably rotate with high accuracy.

Note that the magnets 69 are disposed in the two opposing positions, that is, at an angular interval of 180° in the second embodiment; however, as long as the magnets 69 do not interfere with the motor substrates 55 and are arranged at regular angular intervals, the magnets 69 may be disposed in three positions at angular intervals of 120° or in four positions at angular intervals of 90°.

In the second embodiment, the supporting plate 62 is disposed in one position, and the angle measuring sensors 65 are disposed in portions, facing the protractors 61, of the extending portions 62a.

Note that in the first embodiment and the second embodiment, the protractors 61 disposed on side surfaces (surfaces orthogonal to the axis) of the ring gears 46 and the angle measuring sensors 65 disposed on the extending portions 62a, 62b facing the protractors 61 constitute the encoders; however, encoders may be disposed on the rotation shafts of the driving timing pulleys 57 and may detect rotation angles of the driving timing pulleys 57 to detect rotation angles of the prism deflection plates 36a, 36b.

What is claimed is:

1. A deflecting device comprising:
a holding member having a ring shape;
ring gears disposed on both sides of the holding member with the holding member interposed between the ring gears, the ring gears being concentric with the holding member;
rotary bearings disposed between the holding member and the ring gears on both sides of the holding member, the rotary bearings being concentric with the holding member;
optical deflecting members disposed at central portions of the ring gears and integrated with the ring gears;
deflection motors corresponding to the respective ring gears;
a drive transmitting member configured to transmit rotary force of the deflection motors to the ring gears; and
urging members configured to urge the ring gears in a direction parallel with rotation axes of the ring gears;
wherein each of the rotary bearings includes an outer ring fitted into and fixed to an outer ring fitting section on either one of the holding member and the corresponding ring gear,
each of the rotary bearings includes an inner ring fitted into and fixed to an inner ring fitting section on the other of the holding member and the corresponding ring gear,
the ring gears on both sides of the holding member are supported by the holding member, the ring gears being configured to rotate independently of each other, and
the deflection motors are configured to independently rotate the respective optical deflecting members together with the ring gears with the urging members urging the ring gears.

2. The deflecting device according to claim 1 further comprising a supporting plate fixed to an outer peripheral surface the holding member, wherein the supporting plate includes extending portions each extending parallel with a side surface of the corresponding ring gear, and each of the urging members includes a magnetic member having a ring shape and fixed to the side surface of each of the ring gears and a magnet disposed in a portion, facing the magnetic member, of the corresponding extending portion.

3. The deflecting device according to claim 2 further comprising:

a protractor disposed on a surface of each of the ring gears, the protractor being concentric with each of the ring gears; and an angle measuring sensor disposed in a portion, facing the protractor, of one of the extending portions.

4. The deflecting device according to claim 1 further comprising a plurality of supporting plates fixed to an outer peripheral surface of the holding member at regular angular intervals, wherein each of the plurality of supporting plates includes extending portions each extending parallel with a side surface of the corresponding ring gear, and each of the urging members includes a magnetic member having a ring shape, disposed on the corresponding extending portion, and concentric with the holding member, and a magnet disposed in a portion, facing the magnetic member, of the side surface of each of the ring gears.

5. The deflecting device according to claim 4 further comprising:

a protractor disposed on a surface of each of the ring gears, the protractor being concentric with each of the ring gears; and an angle measuring sensor disposed in a portion, facing the protractor, of one of the extending portions.

6. The deflecting device according to claim 1, wherein each of the urging members includes a magnetic member having a ring shape and disposed on a peripheral surface of the corresponding ring gear while protruding toward an outer periphery, and a magnet disposed on an outer peripheral surface of the holding member while facing the magnetic member.

7. The deflecting device according to claim 6 further comprising a supporting plate fixed to an outer peripheral surface of the holding member, wherein the supporting plate includes extending portions each extending parallel with a side surface of the corresponding ring gear, and the deflecting device further includes:

a protractor disposed on the side surface of each of the ring gears, the protractor being concentric with each of the ring gears; and an angle measuring sensor disposed in a portion, facing the protractor, of each of the extending portions.

8. A surveying instrument comprising:

a distance meter including:

a light emitting element configured to send out distance measuring light;

a distance measuring light emitter configured to emit the distance measuring light;

a receiver configured to receive reflected distance measuring light; and a light receiving element configured to receive the reflected distance measuring light and to generate a light reception signal;

the distance meter being configured to measure a distance to a measurement target object on a basis of the light reception signal from the light receiving element;

an optical axis deflector disposed on a distance measuring optical axis and configured to deflect the distance measuring optical axis, wherein the optical axis deflector further comprises:

a holding member having a ring shape;

ring gears disposed on both sides of the holding member with the holding member interposed between the ring gears, the ring gears being concentric with the holding member;

rotary bearings disposed between the holding member and the ring gears on both sides of the holding member, the rotary bearings being concentric with the holding member;

optical deflecting members disposed at central portions of the ring gears and integrated with the ring gears;

deflection motors corresponding to the respective ring gears;

a drive transmitting member configured to transmit rotary force of the deflection motors to the ring gears; and urging members configured to urge the ring gears in a direction parallel with rotation axes of the ring gears;

wherein each of the rotary bearings includes an outer ring fitted into and fixed to an outer ring fitting section on either one of the holding member and the corresponding ring gear, each of the rotary bearings includes an inner ring fitted into and fixed to an inner ring fitting section on the other of the holding member and the corresponding ring gear, the ring gears on both sides of the holding member are supported by the holding member, the ring gears being configured to rotate independently of each other, and the deflection motors are configured to independently rotate the respective optical deflecting members together with the ring gears with the urging members urging the ring gears;

an emission direction detector configured to detect a deflection angle of the distance measuring optical axis; and a computation controller configured to control deflection action of the optical axis deflector and distance measuring action of the distance meter, and to measure a horizontal angle and a vertical angle of the measurement target object, based on the deflection angle detected by the emission direction detector and acquires three-dimensional coordinates of the measurement target object, based on a distance value from the distance meter and the horizontal angle and vertical angle.

9. The surveying instrument of claim 8, wherein the optical axis deflector further comprises:

a supporting plate fixed to an outer peripheral surface the holding member, wherein the supporting plate includes extending portions each extending parallel with a side surface of the corresponding ring gear, and each of the urging members includes a magnetic member having a ring shape and fixed to the side surface of each of the ring gears and a magnet disposed in a portion, facing the magnetic member, of the corresponding extending portion.

10. The surveying instrument of claim 9, wherein the optical axis deflector further comprises:
- a protractor disposed on a surface of each of the ring gears, the protractor being concentric with each of the ring gears; and
- an angle measuring sensor disposed in a portion, facing the protractor, of one of the extending portions.

11. The surveying instrument of claim 8, wherein the optical axis deflector further comprises:
- a plurality of supporting plates fixed to an outer peripheral surface of the holding member at regular angular intervals, wherein each of the plurality of supporting plates includes extending portions each extending parallel with a side surface of the corresponding ring gear, and
- each of the urging members includes a magnetic member having a ring shape, disposed on the corresponding extending portion, and concentric with the holding member, and a magnet disposed in a portion, facing the magnetic member, of the side surface of each of the ring gears.

12. The surveying instrument of claim 11, wherein the optical axis deflector further comprises:
- a protractor disposed on a surface of each of the ring gears, the protractor being concentric with each of the ring gears; and
- an angle measuring sensor disposed in a portion, facing the protractor, of one of the extending portions.

13. The surveying instrument of claim 8, wherein each of the urging members of the optical axis deflector includes a magnetic member having a ring shape and disposed on a peripheral surface of the corresponding ring gear while protruding toward an outer periphery, and a magnet disposed on an outer peripheral surface of the holding member while facing the magnetic member.

14. A surveying instrument comprising:
- a distance meter including:
  - a light emitting element configured to send out distance measuring light;
  - a distance measuring light emitter configured to emit the distance measuring light;
  - a receiver configured to receive reflected distance measuring light; and
  - a light receiving element configured to receive the reflected distance measuring light and to generate a light reception signal;
  - the distance meter being configured to measure a distance to a measurement target object on a basis of the light reception signal from the light receiving element;
- an optical axis deflector disposed on a distance measuring optical axis and configured to deflect the distance measuring optical axis, wherein the optical axis deflector further comprises:
  - a holding member having a ring shape;
  - ring gears disposed on both sides of the holding member with the holding member interposed between the ring gears, the ring gears being concentric with the holding member;
  - rotary bearings disposed between the holding member and the ring gears on both sides of the holding member, the rotary bearings being concentric with the holding member;
  - optical deflecting members disposed at central portions of the ring gears and integrated with the ring gears;
  - deflection motors corresponding to the respective ring gears;
  - a drive transmitting member configured to transmit rotary force of the deflection motors to the ring gears; and
  - urging members configured to urge the ring gears in a direction parallel with rotation axes of the ring gears;
  - wherein each of the rotary bearings includes an outer ring fitted into and fixed to an outer ring fitting section on either one of the holding member and the corresponding ring gear,
  - each of the rotary bearings includes an inner ring fitted into and fixed to an inner ring fitting section on the other of the holding member and the corresponding ring gear,
  - the ring gears on both sides of the holding member are supported by the holding member, the ring gears being configured to rotate independently of each other, and
  - the deflection motors are configured to independently rotate the respective optical deflecting members together with the ring gears with the urging members urging the ring gears;
- an emission direction detector configured to detect a deflection angle of the distance measuring optical axis; and
- a computation controller configured to control deflection action of the optical axis deflector and distance measuring action of the distance meter; and
- a supporting plate fixed to an outer peripheral surface the holding member,
  - wherein the supporting plate includes extending portions each extending parallel with a side surface of the corresponding ring gear, and
  - each of the urging members includes a magnetic member having a ring shape and fixed to the side surface of each of the ring gears and a magnet disposed in a portion, facing the magnetic member, of the corresponding extending portion;
- an emission direction detector configured to detect a deflection angle of the distance measuring optical axis; and
- a computation controller configured to control deflection action of the optical axis deflector and distance measuring action of the distance meter and to measure a horizontal angle and a vertical angle of the measurement target object, based on the deflection angle detected by the emission direction detector and acquires three-dimensional coordinates of the measurement target object, based on a distance value from the distance meter and the horizontal angle and vertical angle.

15. The surveying instrument of claim 14, wherein the optical axis deflector further comprises:
- a protractor disposed on a surface of each of the ring gears, the protractor being concentric with each of the ring gears; and
- an angle measuring sensor disposed in a portion, facing the protractor, of one of the extending portions.

* * * * *

UNITED STATES PATENT AND TRADEMARK OFFICE
CERTIFICATE OF CORRECTION

PATENT NO. : 11,035,936 B2
APPLICATION NO. : 16/019794
DATED : June 15, 2021
INVENTOR(S) : Hideyuki Matsumoto et al.

Page 1 of 1

It is certified that error appears in the above-identified patent and that said Letters Patent is hereby corrected as shown below:

On the Title Page

Item (72) Inventors, the residence information for Inventor Fumio Ohtomo "Asaka (JP)" should read --Asaka-shi (JP)--

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*